United States Patent
Kirkegaard et al.

(10) Patent No.: US 6,713,891 B2
(45) Date of Patent: Mar. 30, 2004

(54) WIND MILL WITH A SUSPENSION FOR CABLES AND THE LIKE, SUCH SUSPENSION FOR CABLES AND THE LIKE AND A HOLDER FOR SUCH SUSPENSION

(75) Inventors: Karsten Kirkegaard, Randers (DK); Per Kristensen, Randers (DK); Peder Wehner Lindberg, Grenaa (DK)

(73) Assignee: Dan-Control Engineering A/S, Hammel (DK)

( * ) Notice: Subject to any disclaimer, the term of this patent is extended or adjusted under 35 U.S.C. 154(b) by 52 days.

(21) Appl. No.: 09/880,904

(22) Filed: Jun. 15, 2001

(65) Prior Publication Data

US 2002/0012582 A1 Jan. 31, 2002

Related U.S. Application Data

(63) Continuation of application No. PCT/DK99/00708, filed on Dec. 17, 1999.

(30) Foreign Application Priority Data

Dec. 17, 1998 (DK) .......................................... 1998/01661

(51) Int. Cl.[7] .................................................. F03D 9/00
(52) U.S. Cl. .............................. 290/44; 290/55; 52/40
(58) Field of Search ................ 290/44; 52/40

(56) References Cited

U.S. PATENT DOCUMENTS

| | | | | |
|---|---|---|---|---|
| 3,227,406 A | * | 1/1966 | Shelton et al. ............. 348/74.4 |
| 4,545,728 A | * | 10/1985 | Cheney, Jr. .................... 416/11 |
| 4,684,196 A | * | 8/1987 | Smith et al. ................. 439/411 |
| 4,775,122 A | | 10/1988 | McClymont ............... 248/74.4 |
| 5,195,704 A | | 3/1993 | Louie ......................... 248/744 |
| 5,271,588 A | | 12/1993 | Doyle ....................... 248/68.1 |
| 5,675,128 A | | 10/1997 | Simon .................... 174/152 G |
| 5,794,897 A | | 8/1998 | Jobin et al. ................ 248/67.5 |
| 6,467,233 B1 | * | 10/2002 | Maliszewski et al. ...... 52/720.1 |

FOREIGN PATENT DOCUMENTS

| DE | 2650145 | 6/1978 |
|---|---|---|
| FR | 1 090 367 | 3/1955 |

* cited by examiner

*Primary Examiner*—Thomas M. Dougherty
*Assistant Examiner*—Leda Pham
(74) *Attorney, Agent, or Firm*—Birch, Stewart, Kolasch & Birch, LLP

(57) ABSTRACT

A wind turbine has a suspension and holders for such suspensions. Elongated members such as electrical power cables can be suspended from the nacelle of a wind turbine and down through the tower of the wind turbine. The suspension utilizes either a high friction between an inner rod and outer plates to hold the member by ensuring that the length of the inner rod and the supporting plates is at least four times the diameter of the members or a more mechanical holding of the members by providing beads in clamping portions constituting the suspension.

13 Claims, 17 Drawing Sheets

WIND MILL WITH A SUSPENSION FOR CABLES AND THE LIKE, SUCH SUSPENSION FOR CABLES AND THE LIKE AND A HOLDER FOR SUCH SUSPENSION

This application is a Continuation of PCT International Application No. PCT/DK99/00708 filed on Dec. 17, 1999, which was published in English and which designated the United States and on which priority is claimed under 35 U.S.C. §120, the entire contents of which are hereby incorporated by reference.

FIELD OF THE INVENTION

The present invention relates to a wind turbine with a suspension and such a suspension for attaching elongated members such as cables, cords, wires or the like, said suspension comprising a first clamping portion and a second clamping portion, said clamping portions being intended for clamping around the member, and where the first clamping portion and the second clamping portion may be displaced inwards against towards each other and by means of securing means may be secured around the item. The invention also relates to a holder for such suspension.

BACKGROUND OF THE INVENTION

U.S. Pat. No. 5,195,704 describes a clamp for securing a cord or the like. The clamp comprises a body and a cover, each provided with surfaces for supporting the cord. Each part comprises a clamping portion and a through-going bead, extending within the surface of the clamping jaw. The cover is displaceable in relation to the body so that the clamping jaws are more or less tightly engaged. Thus, it is possible to secure cords with different diameters. The cover is displaced in relation to the body and is secured in relation to the body by means of a bolt.

However, this clamp has certain drawbacks. Because of the shape of the clamping jaws, where the inner surfaces of the clamping jaws have a partly circular cross-section with a given radius, it is not possible to secure cords with a smaller diameter as well as cords with a large diameter, and specifically not as well as cords with a diameter corresponding to the radius of the inner surfaces of the clamping jaws. Furthermore, the way that the body and the cover are mutually connected has the drawback that there is a risk of tearing off any insulation of the cords because of the pincers-movement made by the cover in relation to the body, when the two clamping jaws are being displaced towards each other.

U.S. Pat. No. 4,684,196 describes a clamp connector for holding of electrical wires and for connecting of these. The connector comprises a first and a second half portion which are mutually joined and which are provided with at least two corresponding grooves for taking up of the electrical wires. Each of the two half portions is provided with transverse bridging plates that are provided with sets of piercing teeth. The purpose of the connector is to provide a means that is capable of better securing the electrical wires, also even if the ends of the electrical wires are exposed to a permanent deformation when the ends are pushed together in the holder. Furthermore, it is a purpose that the connector itself is not exposed to deformation when the two half portions of the connector are mutually connected and tightened towards each other.

This connector has actually the complete opposite purpose than the present invention and accordingly this connector is provided with means that are very different to the means of the holder of the present invention. The purpose of the above-mentioned connector is to penetrate the insulation of the wires and the wires themselves in order to obtain the conducting contact between the ends of the wires and the transverse bridging plates. Thus, a severe and permanent deformation of not only the insulation but also of the wiring itself is established with the connector of the above-mentioned US-publication.

DE 2 650 145 describes a clamp for hanging up of electrical cables extending horizontally between masts. The clamp comprises an inner shelf clamping around the cable and an outer shelf surrounding the inner shelf. The inner shelf consists of two halves tightened together around the cable. Each of the two halves is provided with jaws together forming a substantially semi-circular cross-section, so that when the two halves of the inner shelf are squeezed together then a substantially circular cross-section is formed through which cross-section the electrical cable stretches. The purpose of the holder is however to provide a holder minimising the risk of water penetrating into the holder and which, if water nevertheless did pass into the holder, assures that the water is led out of the holder again.

This holder has more similarities with the present invention. However, still a substantial drawback is envisaged. Each of the two halves of the inner shelf has opposite end surfaces being pushed towards each other when the two halves of the inner shelf are being tightened together. There is a great risk of the insulation of the electrical wires being squeezed between these opposing surfaces. It is important to bear in mind, that the diameter of the electrical wire may vary depending on the manufacturer of the cables and depending on the type of cable and due to different dimensions depending on temperature and humidity. Especially in the case where the two halves are completely joined and where the opposing surfaces are abutting each other when the halves are joined, then there is an even greater risk of the insulation being squeezed and damaged.

U.S. Pat. No. 5,794,897 describes a hanger for supporting transmission lines such as coaxial cables and the like used in antenna systems. The hanger comprises a clamping structure with two gripping elements. The gripping elements of the clamping structure grip the coaxial cables by means of notches provided on gripping surfaces of the gripping elements. This is accomplished by securing means such as bolt and nut, which tighten the two gripping elements together. The gripping elements are also provided with snapping elements for connecting said gripping elements so that the clamping structure may be used for initially loosely clamping the cables and subsequently firmly clamping the cables when the securing means are tightened.

The document describes the possibility of gripping cables by having beads on gripping surfaces of gripping elements. However, the clamping structure still has the great disadvantage that the outer insulation of the cables may be damaged when the gripping elements are tightened. Because of the expressed need for firstly loosely securing and subsequently firmly securing the cables to the clamping structure, snapping means are provided. These may however squeeze the insulation when the gripping elements are firmly tightened around the cables. Furthermore, there is no mentioning of the special problems occurring within wind turbine towers where the cables may be twisted.

U.S. Pat. No. 4,545,728 describes a wind turbine with yaw spring return means for returning the nacelle of the wind turbine from a position to which it has been turned to the initial position in order to prevent excessive twisting of the power cables and control cables. The power cables and control cables extend loosely and linearly downwards from the nacelle through a passage constituted by an annular bearing to the tower. When the nacelle rotates in relation to the tower, the cables will twist as well. When the nacelle by means of the yaw spring returns to its initial position the cables will unwind.

This document does however not disclose special means for suspending the cables extending from the nacelle downward through the passage to the tower. Thus, with no special suspension means and with a twisting of the cables, then there is a great risk of the cables disconnecting from whichever attachment means they may be connected to. Also, cables extending form the nacelle and downwards through high towers will experience that the weight of the cables together with only a slight twisting of the cables may cause the cables to disconnect in response to a combination of the load from the weight of the cables just added a small force from the slight twisting of the cables.

BRIEF DESCRIPTION OF THE INVENTION

It is the object of the present invention to provide a suspension capable of securing cords, cables, wires, hoses and the like with varying diameters with the same degree of securing, but also securing these items in a better way and especially a suspension for suspending the items vertically. Moreover, it is the object of the invention to provide a suspension without the risk of damaging the items or the insulation of the items.

The object is achieved by a wind turbine having a first suspension characterised in that the wind turbine further comprising at least a first suspension being suspended by the nacelle, the first cable suspension defining substantially vertically extending supporting surfaces, the outer surface of each of said elongated members such as electrical power cables for a longitudinal length of at least four times the mean outer diameter of the member being in abutting contact with and squeezed between at least two of each supporting surfaces so that a substantial part of the weight of the member is supported by the first suspension. The object may also be obtained by the suspension itself before installation in the wind turbine.

The object may also be achieved by a wind turbine having a second suspension characterised in that the wind turbine further comprising at least a first suspension being suspended by the nacelle, the first cable suspension defining substantially vertically extending supporting surfaces, the outer surface of each of said elongated members such as electrical power cables for a longitudinal length of between one and two times the mean outer diameter of the member and that the vertically extending supporting surfaces are provided with beads, and the member being in abutting contact with and squeezed between at least two of each supporting surfaces so that a substantial part of the weight of the member is supported by the first cable suspension. The object may also be obtained by the suspension itself before installation in the wind turbine.

By the present invention a means is provided for suspending elongated members such as electrical power cables, hydraulic hoses, ropes and the like which eliminates the risk of as example cables detaching from the nacelle causing failure in delivering the electrical power from the generator system of the wind turbine to the user. This is especially a risk in tall wind turbines that are becoming more and more common because of an increasing demand for wind turbines with larger and larger electrical capacity. Also, when using wind turbines with higher towers there is the risk of the electrical cables twisting inside the tower when the nacelle is pivoted in relation to the tower. In the following reference will mainly be made to electrical power cables as an example of elongated members to be suspended. However, the reference to electrical power cables does not limit the type of elongated members that the invention may be used for.

By letting the clamping portions extend around each other and by letting the clamping portions being assembled linearly and by letting the inner surface of the clamping portions extend in continuation of the inner surface of the jaws on the first clamping portion, it is achieved that no pincers-movement will occur when the clamping portions are assembled around e.g. the cable. Moreover it is achieved that it is possible to leave a large part of the inner surface of the clamping portions free so that the clamping around the cable can take place independently of the mutual engagement between the clamping portions.

In a preferred embodiment of invention the suspension is shaped in such a manner that the inner surface of the first clamping portion has a substantially semicircular contour, that the inner surface of the second clamping surface has a substantially semicircular contour, and that in a first application situation the clamping portions are secured so that the inner surfaces of the two clamping portions form a through-going hole which is circular when the clamping portions are assembled, and in a second application situation are secured so that the inner contour of the inner surfaces of the two clamping surfaces form a through-going hole which is oval when the clamping portions are assembled.

By providing through-going holes between the jaws on the clamping portions, being either round or oval, with said clamping portions it is made possible to secure e.g. cables with different diameters. In a preferred embodiment the suspension is characterised in that the suspension comprises a first clamping portion and furthermore comprises a first embodiment of a second clamping portion and a second embodiment of the second clamping portion, and that both the first embodiment and the second embodiment of the second clamping portion each are capable of co-operating with the first clamping portion, and where the through-going hole is substantially round when the first clamping portion co-operates with the first embodiment of the second clamping portion, and the through-going hole is substantially oval when the first clamping portion co-operates with the second embodiment of the second clamping portion.

By using the said first clamping portion but various second clamping portions, it is possible to obtain same large variation in diameter of e.g. those cables which the suspension is capable of securing. It is an advantage that only a single embodiment of the first clamping portion is capable of co-operation with various embodiments of the second clamping portion as it is then possible to retain the first clamping portion attached to e.g. a holder, and at the same time it is possible to replace the second clamping portion in order to secure e.g. different cables with different diameters.

The clamping portions according to the present invention are preferentially manufactured and are preferentially used as separate clamping portions. In an alternative embodiment, by the manufacture and the use of the clamping portions it will however be possible to join the first clamping portion with the second clamping portion by means of a kind of hinge device. This may have the advantage that already at the manufacture it is made easier to figure out, in connection with the later use, which clamping portions belong together, and that the first clamping portion and the second clamping portion are already joined together when the cable are mounted between the clamping portions, and the ears of the clamping portions are subsequently squeezed together by means of the bolts which extend through the holes in the ears.

Moreover, it will be possible to join a plurality of first and a plurality of second clamping portions so that a row of first clamping portions and a row of second corresponding clamping portions are formed. This opens up the possibility of delivering the clamping portions in tapes comprising several clamping portions of the same type. The type of clamping portion, which is suitable, can then be broken off or cut off the tape with the clamping portion of the type in question. It will also be possible to provide a combination of connections between a first clamping portion and a second clamping portion and connections in a tape partly between a plurality of first clamping portions and partly between a plurality of second corresponding clamping portions.

In a preferred embodiment a plurality of cable spacing devices are arranged between the electrical power cables with a vertical spacing between neighbouring spacing devices, each spacing device being arranged so as to maintain the power cables in a constant position in a horizontal plane of the spacing device with a mutual spacing between the cables.

By using spacing devices it is intended to keep a distance between the cables. Because of the electrical current running through the cables the cables are slightly heated. However if perhaps six cables are hanging from the nacelle and down through the tower, the heating will take place of all six cables at the same time. In this case it is especially necessary to maintain a distance between the cables. It is also necessary to maintain a distance between the cables in order to eliminate the risk of wear of the insulation of the cables. If the cables are passed down through the tower in a bundle the cables will slide along each other when the nacelle is pivoting in relation to the tower. Using spacers ensures that this mutual sliding is avoided.

In a further preferred embodiment the plurality of electrical power cables forms a down-hanging curve and is secured to the stationary part of the wind turbine at a vertical position above the lowest part of the curve, the vertical extent of the loop at the reference position of the nacelle being of a magnitude sufficient to ensure that the cable will not be exposed to excessive longitudinal tension due to the relative shortening of the cable caused by twisting of the cable during pivoting of the nacelle.

By securing the cables to the stationary part as example by using a cable support device that is secured to the inner wall of the tower, the cables will be led down through most of the tower along the inner wall of the tower. This makes it possible to eliminate the risk of the cables twisting excessively because the cables are hanging freely in a downwards curve before being led past the suspension, said downwards curve taking up the tensioning of the cable when the nacelle is pivoting in relation to the tower. Also, it eliminates the inconvenience of having the cables to take up space in the center of the tower.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The invention will now be described with reference to the accompanying drawings, which are given by way of illustration only, and thus are not limitative of the present invention, and wherein.

DETAILED DESCRIPTION OF THE PREFERRED EMBODIMENTS

Figure 1:
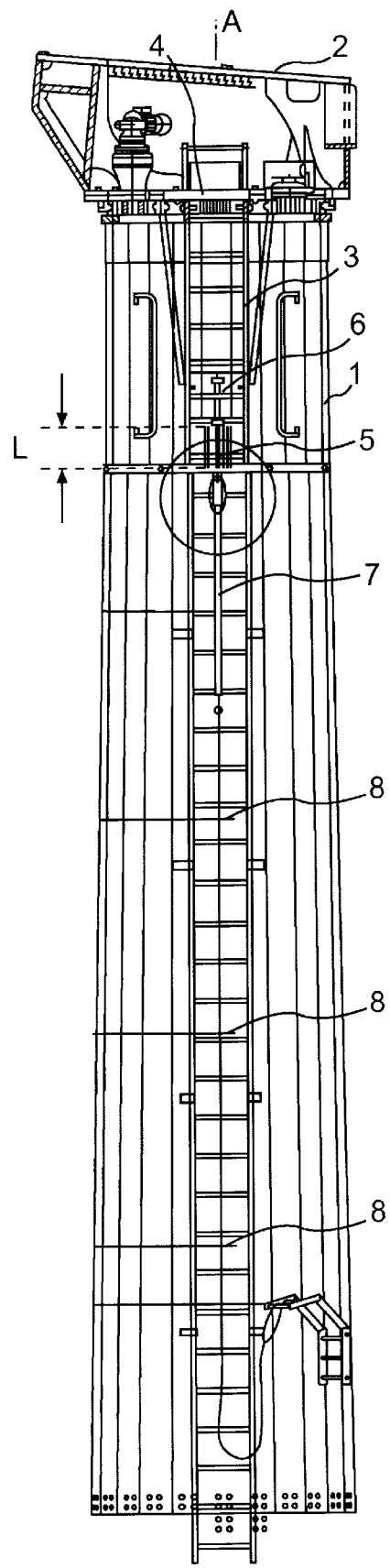
FIG. 1 is a sectional view of a wind turbine tower with a part of a nacelle shown above the top of the tower and with a cable suspension according to the invention.
Figure 8:
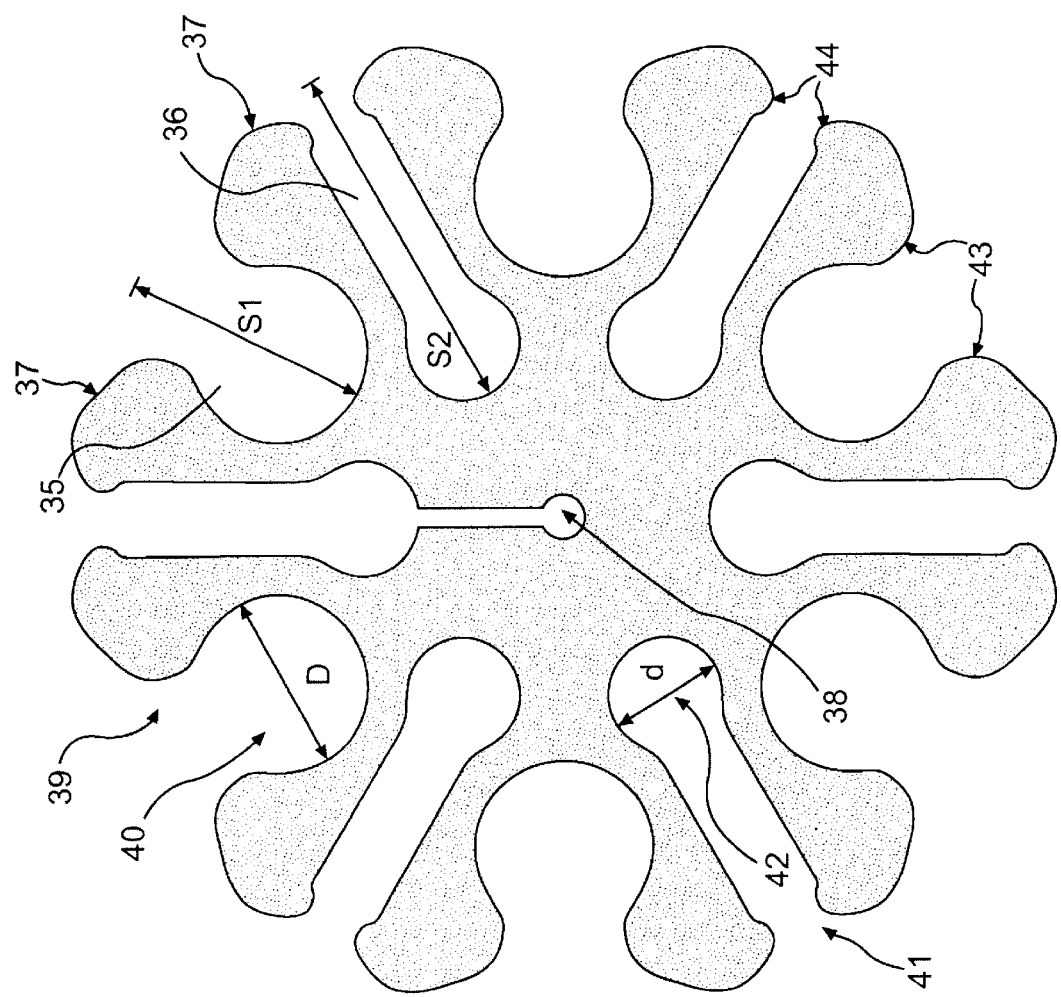
FIG. 8 is a plane view of a cable distance device according to the invention.
Figure 9:
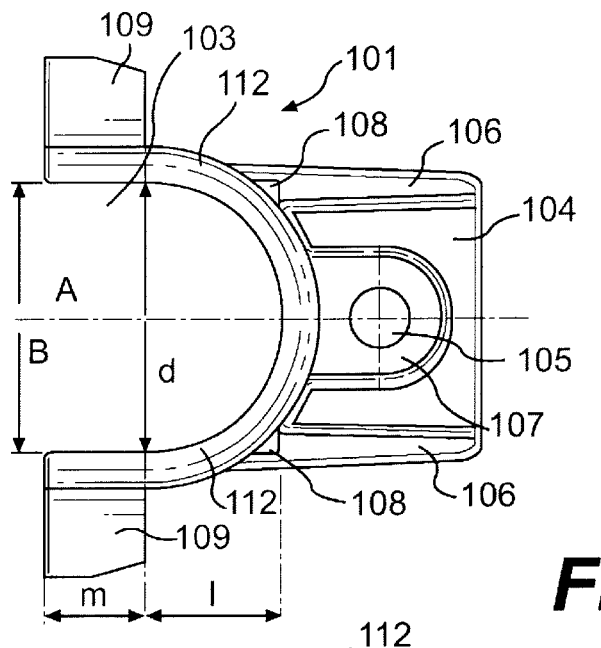
FIG. 9 is a view from beneath of an embodiment of a first clamping portion.
Figure 10:
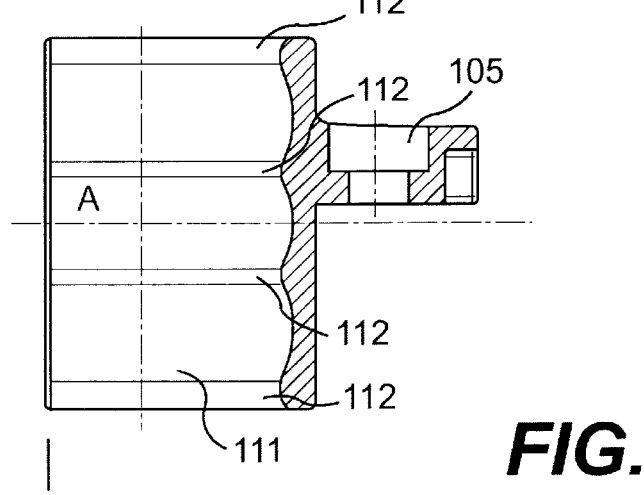
FIG. 10 is a sectional side view through the first clamping portion.
Figure 11:
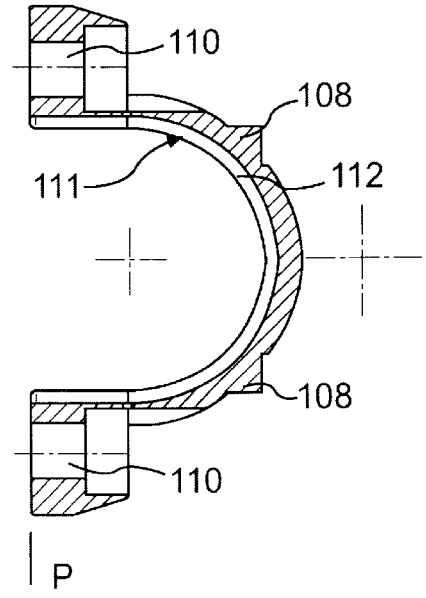
FIG. 11 is a crosswise sectional view through the first clamping portion.
Figure 12:
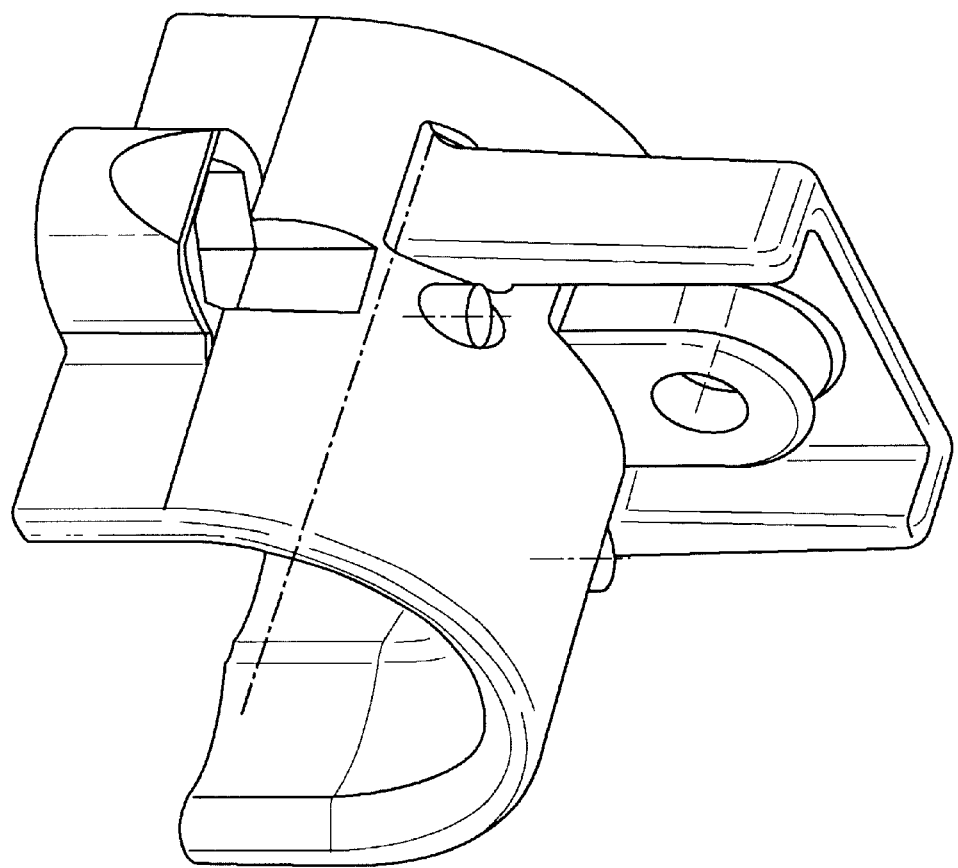
FIG. 12 is a perspective view as seen diagonally from beneath of the first clamping portion.
Figure 13:
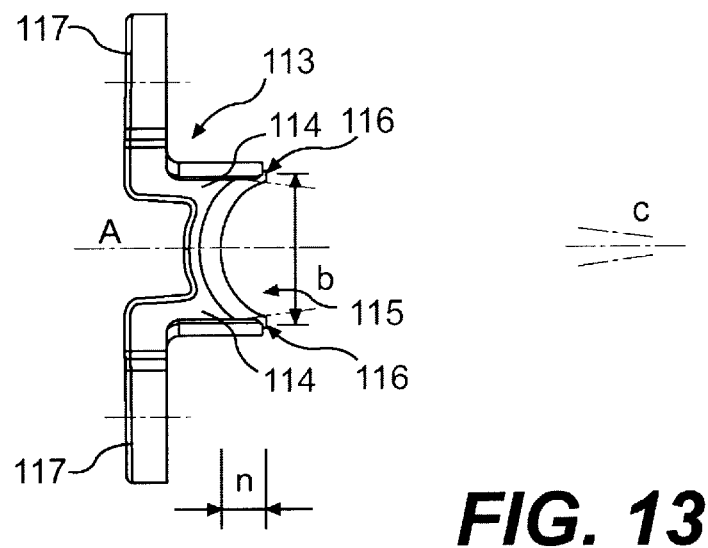
FIG. 13 is a view from beneath of an embodiment of a second clamping portion.

FIG. 1 shows a stationary structure of a wind turbine. The stationary structure comprises a tower 1. A nacelle 2 is placed on top of the tower 1. The nacelle 2 is pivotable around a vertical axis M along the center of the tower 1. A ladder 3 is mounted to the nacelle 2 and extends down into the tower 1 past a passage 4 between the nacelle 2 and the tower 1. A cable suspension 5 is fastened to the ladder 3 and accordingly also fastened to the nacelle 2. The cable suspension has a length L being at least four times the diameter of a cable (see FIG. 3). The cable suspension 5 is fastened to the ladder 3 by means of a linkage 6 being able to swing freely in just one vertical plane perpendicular to the plane of the paper. A wire 7 or a rope extends from the cable suspension 5 further down through the tower 1. The wire 7 or rope is provided with cable spacing devices 8 that are distributed evenly down the wire 7 or rope. The cable spacing devices 8 are intended for maintaining a distance between cables extending from the cable suspension 5 down through the tower 1. A total of four cable spacing devices 8 are distributed with equal distance between the number of devices. A depiction of a cable spacing device seen parallel with the longitudinal axis M is shown in FIG. 8. For the sake of clarity no cables are shown in FIG. 1.

Figure 2:
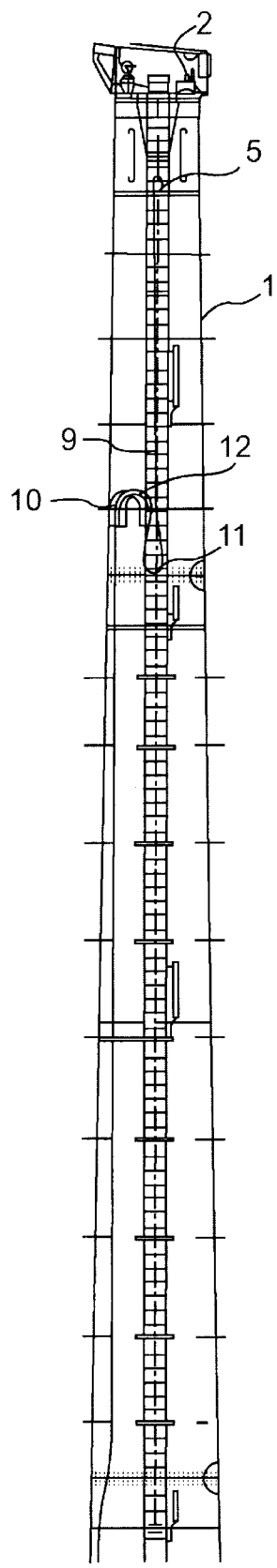
FIG. 2 is a second sectional view of a wind turbine tower with a cable suspension according to the invention and with a fastening device according to the invention

FIG. 2 shows the stationary structure of a wind turbine. The stationary structure also comprises the tower 1. A single cable 9 is shown extending form the cable support that is fastened to the ladder 3. The cable 9 extends down through the tower 1. Partly down the tower the cable is supported by a fastening device 10 (see FIG. 6 and FIG. 7). The fastening device 10 is secured to the inner wall of the tower 1. The cable 9 shows a downward curve 11 along which the cable is hanging freely and an upward curve 12 along which the cable 9 is supported by the fastening device 10. The fastening device 10 has a supporting curved plate (see FIG. 6 and FIG. 7) on which the cable 9 is lying. After having passed the curved plate the cable 9 is fastened to the fastening device 10 by means of fastening plates (see FIG. 6 and FIG. 7). By providing a downwards curve 11 along which the cable 9 is hanging freely it is prevented that a tensioning of the cable 9 when the nacelle 2 is pivoting in relation to the tower 1 will cause the cable to be excessively tensioned and torn apart.

Figure 3:
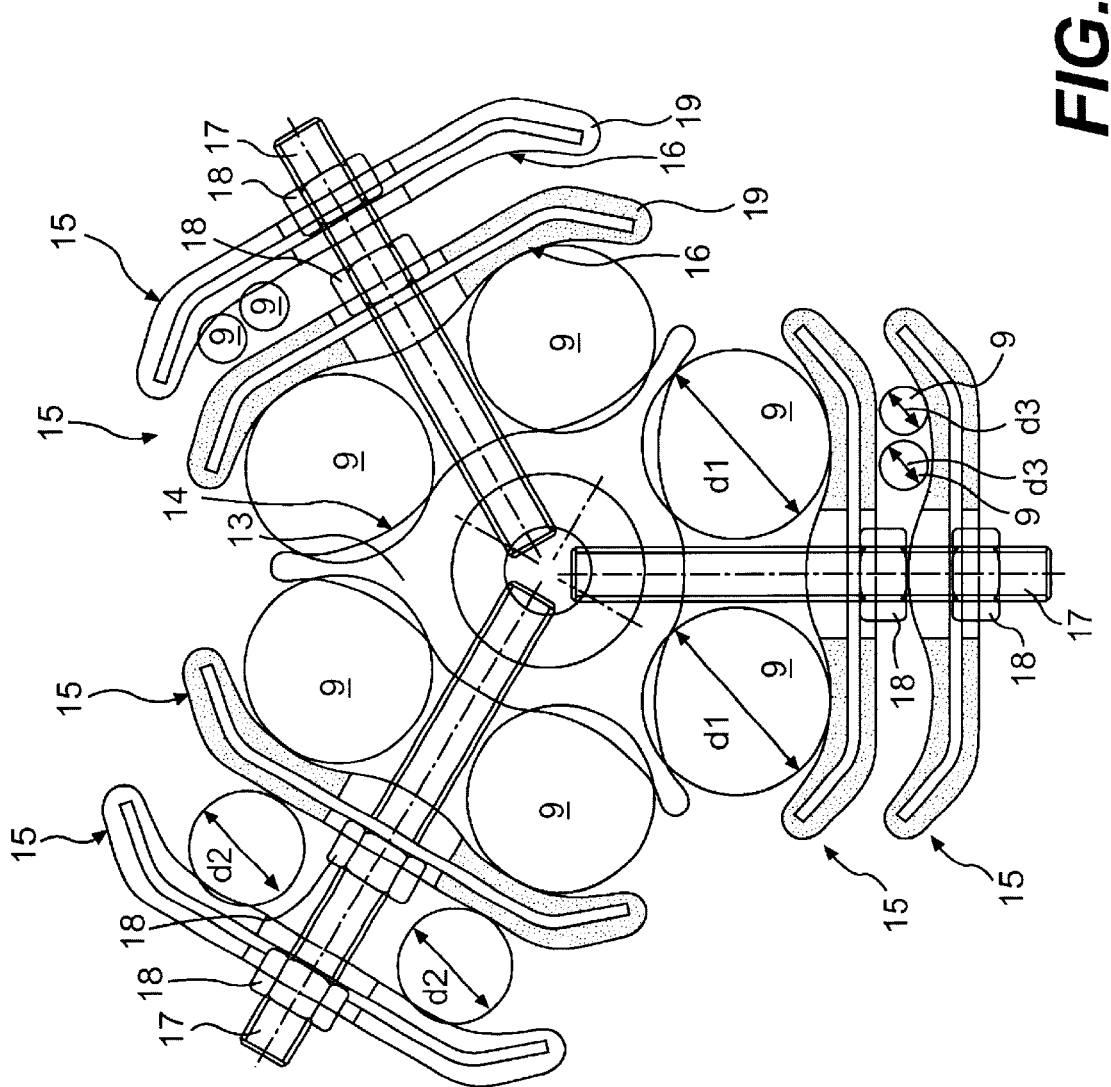
FIG. 3 is a longitudinal view of a cable suspension according to the invention.

FIG. 3 shows a cable suspension 5 according to the invention. The cable suspension 5 is shown parallel with a longitudinal axis of the cable suspension, said longitudinal axis extending perpendicular to the plane of the paper and being vertical, when the cable suspension 5 is placed in the tower 1. The cable suspension 5 comprises an inner supporting rod 13 with a certain special outer curvature 14 and outer supporting plates 15 also with a certain special outer curvature 16. The inner supporting rod 13 and the outer supporting surfaces 15 are mutually connected by a bolt 17 being secured to the inner rod 13 and extending through holes (see FIG. 4 and FIG. 5) in the supporting plates 15. The supporting surfaces 15 may be moved along the bolt 17 in a direction along the bolt, and the supporting plates 15 is maintained in place in relation to the bolt by nuts 18 having a cross section being bigger than the hole (see FIG. 4 and FIG. 5) in the supporting plates 15. Cables 9 are placed between the inner rod 13 and the outer surfaces 15. Due to the certain special outer curvatures 14, 16 of the rod 13 and the supporting plates 15 the inner rod 13 is pressed against the insulation of the cable 9. A frictional layer 19 on the supporting plates 15 is abutting the insulation of the cable 9 opposite where the curvature 14 of the inner rod 13 is pressed against the insulation of the cable 9. Thereby the cable is fastened to the cable suspension 5 without the risk of sliding in a direction perpendicular to the plane of the paper along the inner rod 13 and along the outer supporting plates 15.

In the embodiment shown of the cable suspension 5, the cable suspension is supporting six cables 9 with a large diameter d1 using three curvatures 14 on the inner rod 13 and using three outer supporting plates 15. The cable suspension 5 is also supporting two cables 9 having a medium diameter d2 and four cables having a small diameter d3 using the rear side of the before-mentioned outer supporting plates and the special curvature 16 of further outer supporting plates 15 that are maintained in place in relation to the bolts outwardly in relation the before-mentioned supporting plates 15. The number of cables 9 and the diameter d1, d2, d3 of the cables 9 supported by the cable suspension 9 are optional. It is also possible to exclude the use of the further outer supporting plates 15 if the number of cables 9 being supported by the cable suspension 5 may be supported by the supporting plates 15 only that are keeping the largest cables in place.

Figure 3A:
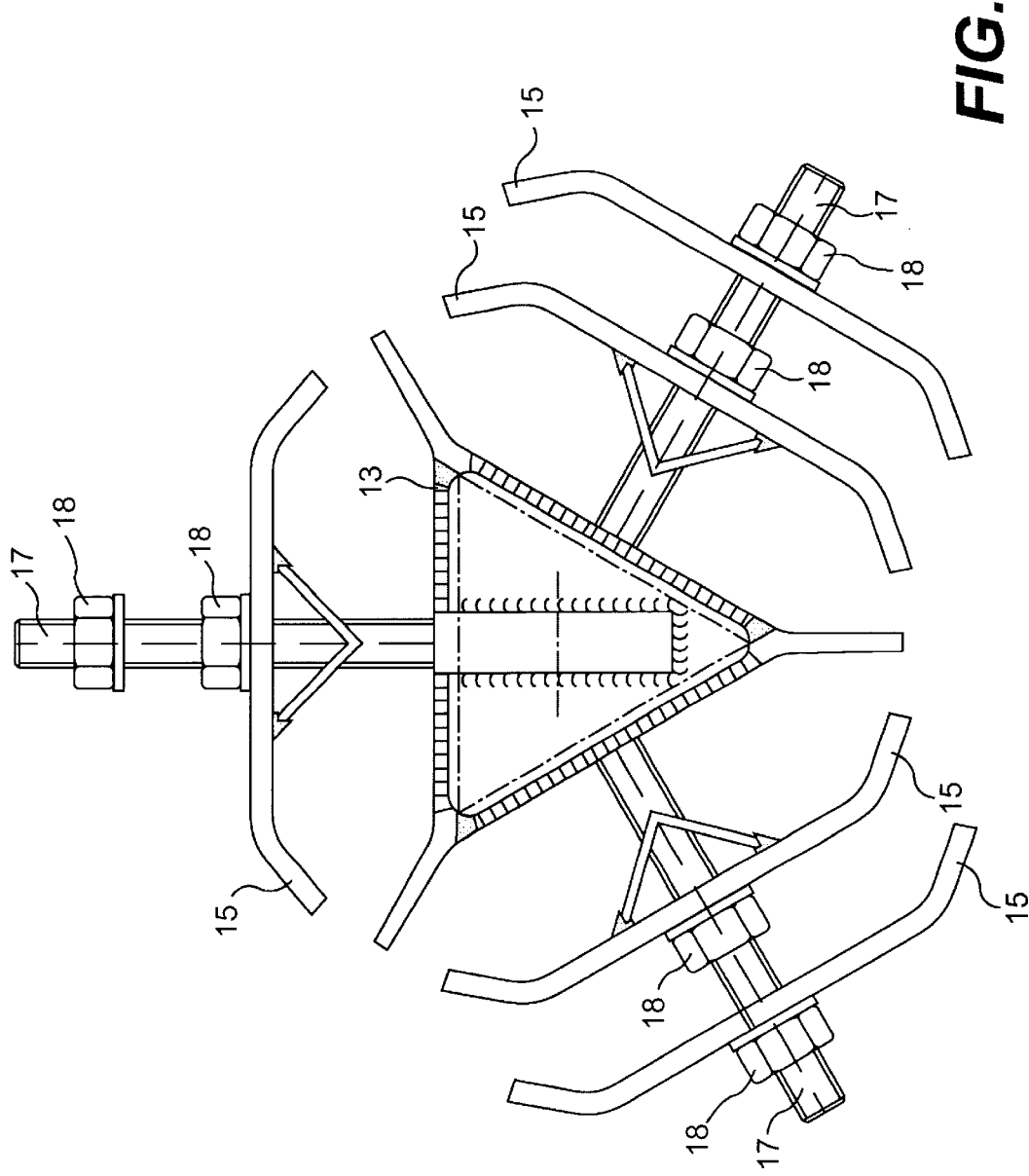
FIG. 3A is a longitudinal view of an alternative cable suspension according to the invention

FIG. 3A shows an alternative embodiment of a cable suspension 5. The cable suspension 5 shown in FIG. 3A has many similarities to the cable suspension shown in FIG. 3. However, while the cable suspension shown in FIG. 3 primarily has an inner rod made of plastic, and has supporting plates coated with rubber or the like, then the cable suspension shown in FIG. 3A is made of steel or other metal, both the inner rod and the supporting surfaces. Neither the inner rod 13 nor the supporting plates 15 are coated with rubber or the like. The metal that the rod 13 and the plates 15 are made of may be coated with a corrosion inhibiting means such as a zinc coating, but the coating is for inhibiting corrosion and is not for increasing friction. Also, the design of the inner rod 13 and of the supporting plates 15 is simpler and is not provided with specially designed curvatures. The inner rod 13 and the supporting plates are just made of plain metal plates individually joined and bent in order to establish the design of the rod 13 and the supporting plates 15 as shown. The cable suspension in FIG. 3A also has bolts 17 and nuts 18 for keeping the supporting plates in place in relation to the inner rod 13.

Figure 4:
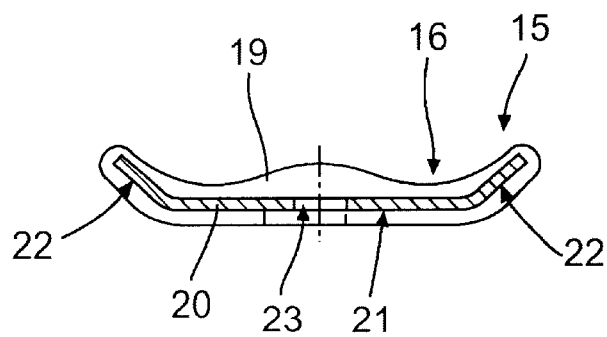
FIG. 4 is a sectional view of a supporting surface of the cable support
Figure 5:
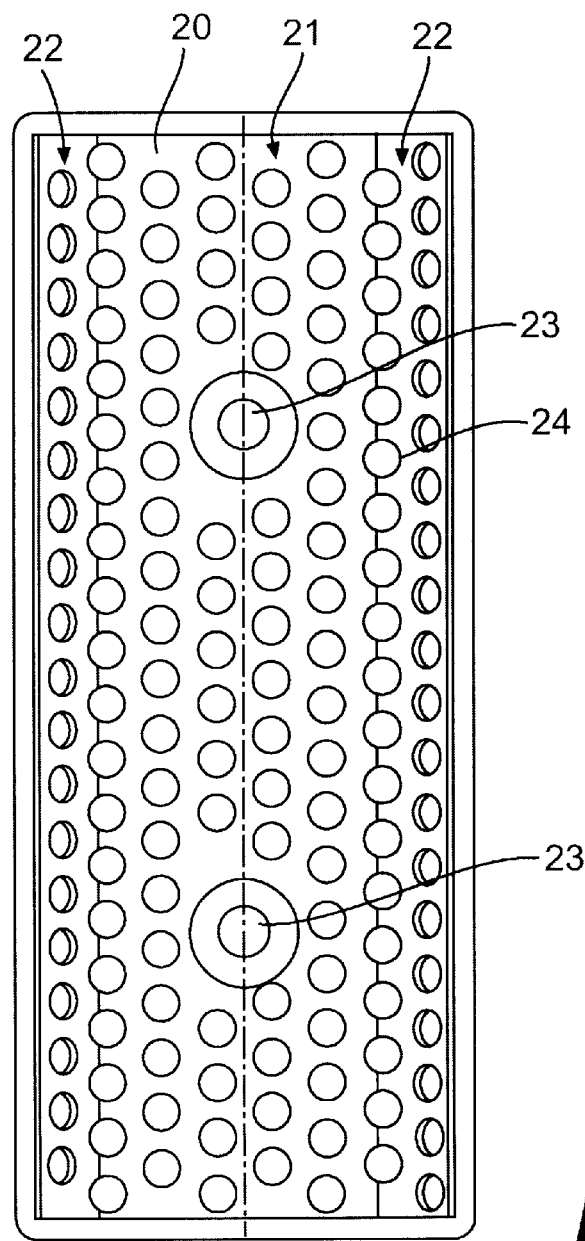
FIG. 5 is a plane view of the supporting surface of the cable support

FIG. 4 and FIG. 5 are a sectional view and a plane view, respectively, showing the design of the outer supporting plate 15 (see FIG. 3). The outer supporting plate 15 has a curvature 16 that is adapted to support the outer surface of a cable such as it is shown in FIG. 3. The supporting plate 15 has an interior plate 20 made of metal with a central plane part 21 and outer bent parts 22. The inner plate 20 has two holes 23 through which the bolts (see FIG. 3) can protrude. The inner plate 20 also has several perforations 24 that limit the weight of the plate 20. A frictional layer 19 such as a plastic or rubber material is moulded around the inner plate 20. The frictional layer 19 forms the certain special curvature 16 of the supporting plate 15.

Optionally, the frictional layer may be omitted thereby constituting plane metal plates such as those used in the suspension shown in FIG. 3A. In order to maintain a satisfactory friction then the perforation will normally be omitted too in order to have en even and unbroken surface against which the outer surface of the cables is supported. However, if the cables are of a relatively small diameter, or if the cables that are to be suspended are not long, then a satisfactory friction may be obtained also if the perforations are present.

Nevertheless, it will be possible to combine the type of and the design of the inner rod shown in FIG. 3 with either the supporting plates shown in FIG. 5 and FIG. 5 as is the case of the suspension shown in FIG. 3 or with a type of and design of plates as mentioned above and as shown as part of the suspension shown in FIG. 3A. It will also be possible to combine the inner rod shown in FIG. 3A with a type of plate as mentioned above as is the case of the suspension in FIG. 3A or with a type of plate as shown in FIG. 4 and FIG. 5.

Figure 6:
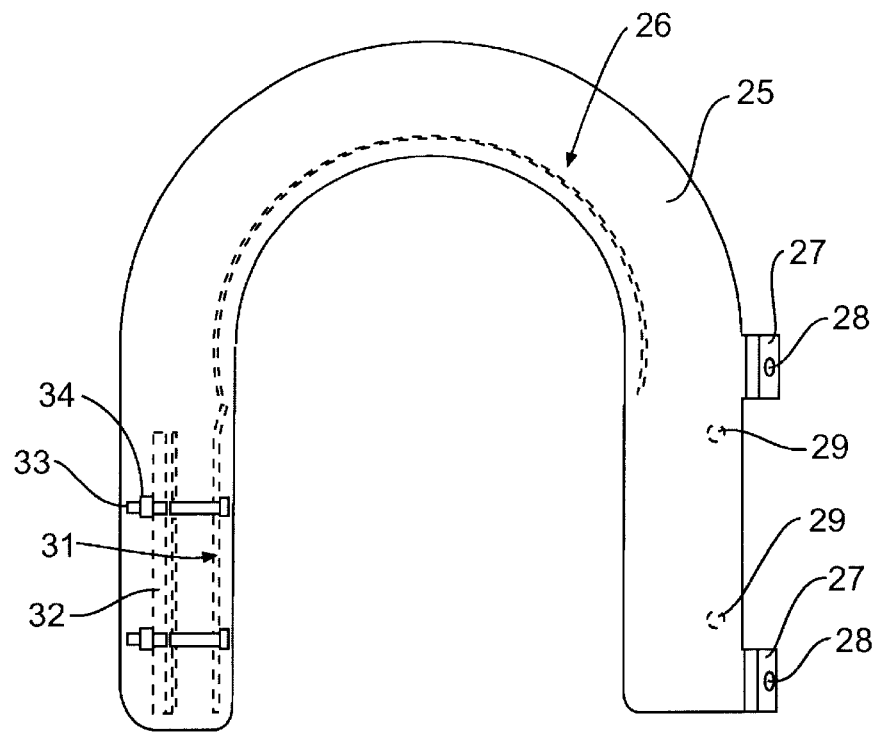
FIG. 6 is a sideways view of a fastening device according to the invention
Figure 7:
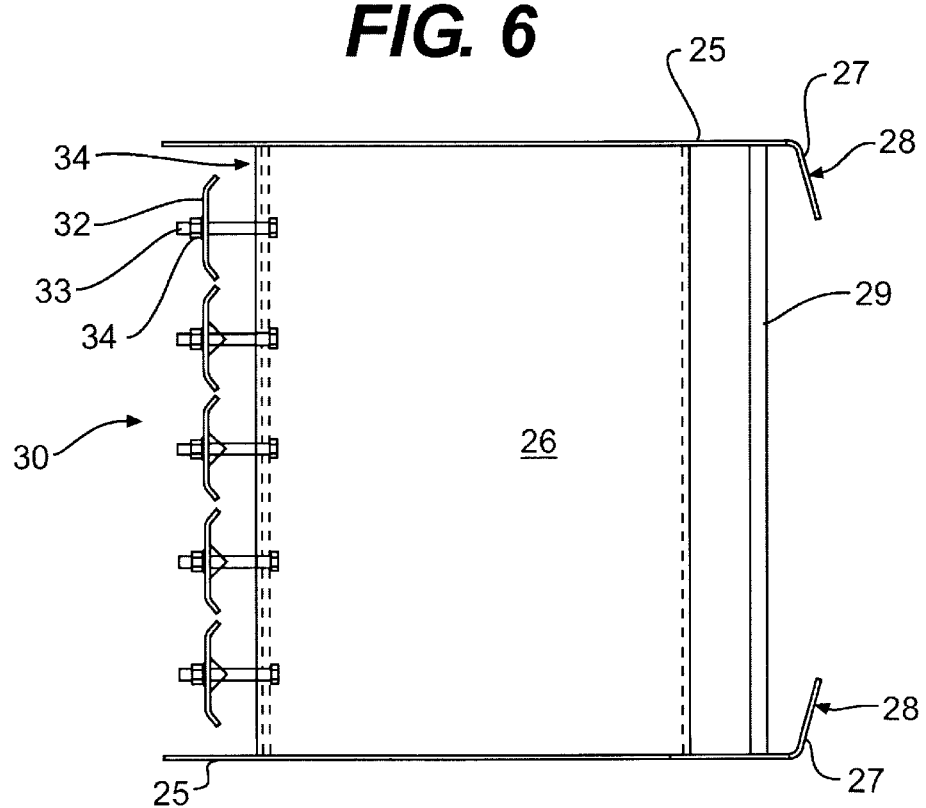
FIG. 7 is a top view of the fastening device according to the invention

FIG. 6 and FIG. 7 are a sideways view and a top view, respectively, of a fastening device 10 for fastening of cables 9 to the tower 1 (see FIG. 2). The fastening device 10 has side plates 25 and between the side plates an upward curved plate 26 is stretching. At the one side of the side plates 25, which in the figure is the right hand side, tongues 27 with holes 28 are provided for securing by means of bolts or the like the fastening device 20 to the inner wall of the tower 1 as shown in FIG. 2. Also at the same one side of the fastening device 10 two bars 29 are provided between the side plates 25. The cables that are to be mounted are led past the bars 29 and afterwards over the curved plate 26 so that the cables are maintained in place between the bars 29 and the plate 26.

At the other side, which in the figure is the left-hand side, the fastening device 10 is provided with fastening means 30 for securing cables to the fastening device. The fastening means 30 comprises a base plate 31 and fastening plates 32 that are placed at a distance from the base plate 31. The distance is established by means of bolts 33 along which the fastening plates 32 can be displaced towards the base plate 31 or away from the base plate 31. The cables are intended for being fastened preferably in pairs between the base plate 31 and a fastening plate 32. If the cables have a relatively small diameter, the fastening plate 32 is displaced further towards the base plate 31 and a nut 34 is tightened. Opposite, if the cables have a relatively large diameter, the nut 34 is loosened and the fastening plate 32 is displaced further away from the base plate 31 whereafter the nut 34 is tightened when the cables are in place.

FIG. 8 is a plane view of a cable spacing device 8 (see FIG. 1) for maintaining a mutual distance between the cables hanging down through the tower. The cable spacing device is suspended down along a wire 7 or a rope as shown in FIG. 1. The device 8 has a polygonal or circular circumference and is provided with slots 35, 36 that extend from the circumference 37 towards the center 38 of the device. The center 38 of the device is provided with a hole 39 through which the wire 7 (see FIG. 1) or rope onto which the device is suspended can run.

The device has a first type of slots 35 that extend from the circumference 37 and only a smaller distance s1 towards the center 38. The first type of slots 35 have an opening 39 at the circumference 37 and lead into a partly circular section 40 having a larger diameter D adapted for holding cables with substantially such a diameter. The device has a second type of slots 36 that extend from the circumference 37 and a greater distance s2 towards the center 38. The second type of slots 36 also have an opening 41 at the circumference 37 and lead into a partly circular section 42 having a smaller diameter d adapted for holding cables with substantially such a diameter. All of the slots 35, 35 are provided with beads 43, 44 that form a sort of closing of the opening 39, 41 into the slots 35, 36. The device is made from a slightly resilient material so that the distance between the beads 43, 44 is enlarged and the opening 39, 41 of the slots 35, 36 is widened when the cables are to be introduced into the slots 35, 36. Alternatively the spacing device 8 can be made of a material being less resilient such as metal and the introduction of the cables into the slots 35, 36 past the beads 43, 44 is obtained by squeezing the insulation of the cables past the beads 43, 44.

FIGS. 9, 10, 11 and 12 show a first clamping portion 101 for a suspension according to the invention. The clamping portion 101 comprises two jaws 102, which along a first stretch L run in a semicircle, and which along second stretches m run rectilinearly in continuation of the semicircle. The semicircle has a diameter d. The second stretches m may run parallel with each other and parallel with a longitudinal axis of the extent of the jaws. Alternatively, the second stretches m may converge a little towards each other towards an opening 3 of the clamping portion. It is the jaws 102 that form the opening 103, and between the jaws 102 along the stretch m there is a inner width B. In the shown embodiment the inner width B is equal to the diameter d1 of the semicircle within the first stretch 1. However, alternatively the inner width is a little smaller, as example 1 mm smaller, than the diameter d of the semicircle. This has the advantage that when introducing the cables into the clamping portion through the opening, then the cables meet a small resistance when having to pass the opening. Having overcome this resistance the cables are kept in place by a resistance towards slipping out through the opening.

A tongue 104 extends outwards from the jaws 102 in the opposite direction of the opening 103 on the jaws 102 and parallel with the longitudinal axis A of the extent of the jaws 102. The tongue 104 is intended for clamping the clamping portion 101 onto a holder (see FIG. 20), and for that purpose the tongue 104 is provided with a through-going hole 105 for the mounting of a bolt (not shown) or the like clamping means through the hole 105.

In the embodiment shown (see FIG. 10) the hole is formed so as to accommodate the head of a bolt that is passed through the hole. This is done by dividing the hole in a lower part with a smaller diameter and an upper part with a larger diameter for accommodating the head of the bolt. Alternatively, the hole may in stead be shaped so as to accommodate a nut for the bolt. This may be done by shaping the lower part with a larger diameter for accommodating the nut and the upper part with a smaller diameter. In the latter case, the lower part may be hexagonal so that the nut is accommodated with a snug fit in the lower part of the hole. Thereby, the hole itself will be able to restrict the nut from rotating when the bolt is turned during mounting of the clamping portion to the holder (see FIG. 20) and thus eliminating the need for a wrench for the nut and only needing a wrench or a screwdriver for the bolt.

On each side the tongue 104 has a larger thickness forming reinforcing ribs 106, and the tongue 104 also has a larger thickness of material around the hole in order to form a strengthening 107 of the hole.

On the rear side the jaws 102 have two projections 108, extending outwards from the jaws 102 in the opposite direction of the opening 103 of the jaws 102. The projections 108 extend outwards on each side of the tongue 104, and are intended for forming abutment with a plate (see FIG. 20) on a holder for mounting a plurality of clamping portions.

On each side of the jaws 102 the clamping portion 101 is provided with ears 109, extending outwards in a plane p perpendicular to the longitudinal axis A of the jaws 102. The ears 109 are intended for being positioned opposite corresponding ears on the other clamping portion (see FIGS. 13–20). The ears 109 are provided with through-going holes 110 (see FIG. 11) for the mounting of a bolt (not shown) or the like fastening means through the hole 110. The bolt is intended for clasping together the ears 109 of the shown first clamping portion 101 and the ears of the second clamping portion (see FIGS. 13–20) in order to clamp the jaws on each of the clamping portions towards each other.

On an inner side 111 the jaws 102 are provided with a bead 112, extending inwards between the jaws 102. The beads 112 are intended for being pressed into the plastic or rubber insulation of a cable (not shown) or a cord secured in the suspension 101. The beads 111 result in a substantially better securing of a cable or a cord, especially in those cases where the cable or the cord hangs vertically in the suspension 101.

FIGS. 13, 14, 15 and 16 show a second clamping portion 113 for a suspension according to the invention. The clamping portion 113 also comprises jaws 114, which run along a stretch n in a circle curve smaller than a semicircle. The jaws form an opening 115, and between the jaws 114 there is an outer width b. The outer width b of the jaws is smaller than the inner width B of the jaws on the first clamping portion (see FIGS. 9–13). Along the stretch n the outer sides 116 of the jaws 114 run conically with a conicity c turned towards the opening for the jaws 114. This means that the jaws 114 of the shown second clamping portion 113 are capable of stretching into the jaws 102 of the first clamping portion 1 (see FIG. 9).

On each side of the jaws 114 the clamping portion113 is provided with ears 117, extending outwards in a plane q perpendicular to the longitudinal axis A of the jaws 114. The ears 117 are intended for being positioned opposite corresponding ears 109 of the first clamping portion 101 (see FIGS. 9–13). The ears 117 are provided with through-going holes 118 for the mounting of a bolt (not shown) or the like fastening means through the hole 118. The bolt is intended for clasping together the ears 117 of the second clamping portion 113 and the ears 109 of the first clamping portion 101 (see FIGS. 9–13) in order to clamp the jaws of each of the clamping portions towards each other.

Figure 14:
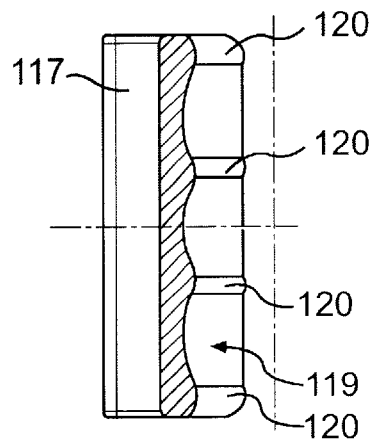
FIG. 14 is a side view through the second clamping portion.
Figure 15:
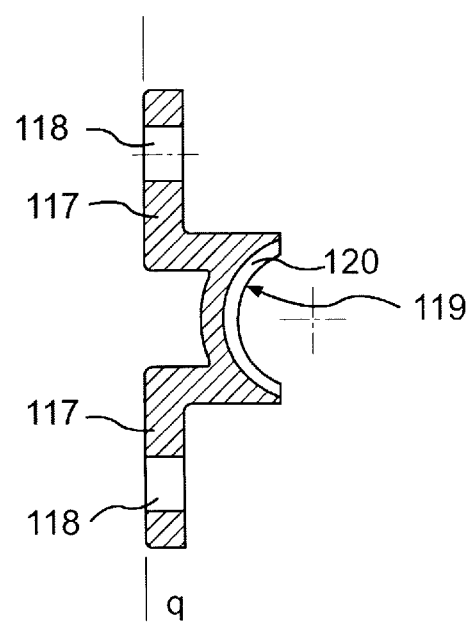
FIG. 15 is crosswise view through the second clamping portion.
Figure 16:
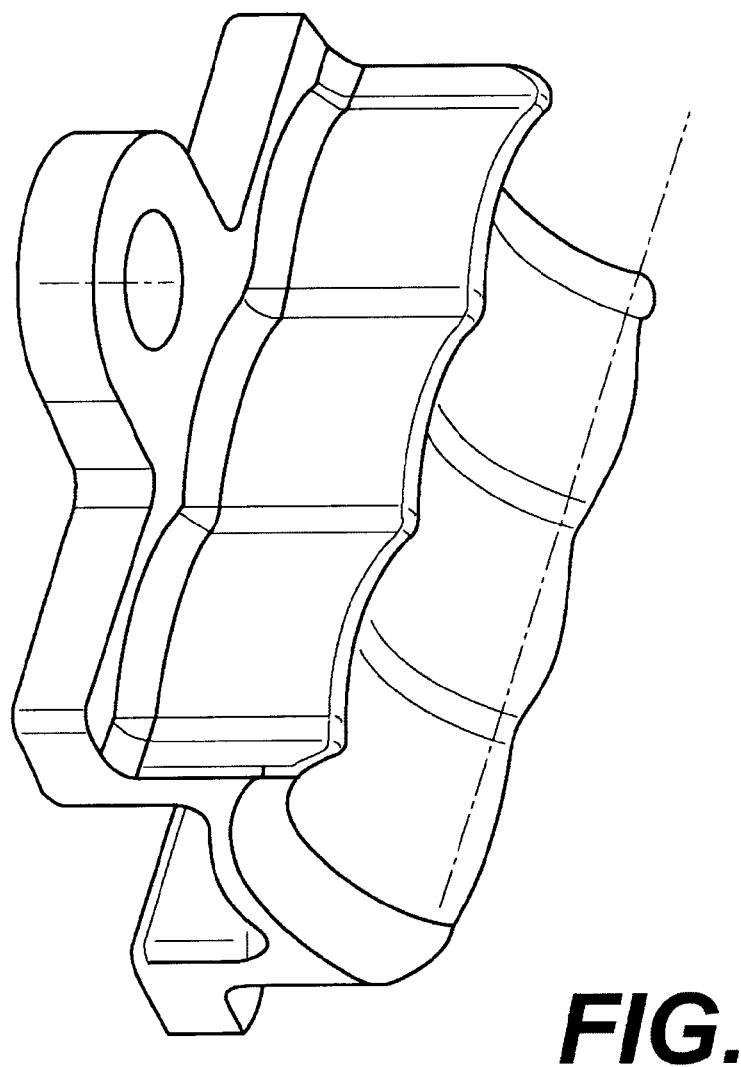
FIG. 16 is a perspective view as seen diagonally from beneath of the second clamping portion.

The jaws 114 are, like the jaws of the first clamping portion, on an inner side 119 provided with a bead 120 extending inwards between the jaws 114. The beads 120 result in a substantially better securing of a cable or a cord, especially in those cases where the cable or the cord hangs vertically in the suspension. In the embodiments shown, see especially the cross-section in FIG. 15, there is a space S between the ears 117. However, in a preferred embodiment this space S is being provided with flanges extending between the ears, in the plane of the paper as seen in FIG. 15 and perpendicular to the plane of the paper as seen in FIG. 14, so as to mutually connect the ears. It has turned out that when clasping the shown second clamping portion together with the first clamping portion (see FIGS. 9–12) and fastening the clamping portion together by means of a bolt (not shown) there is a risk of the ears 117 being bent in relation to each other and in relation to the jaws 114. By providing a number of flanges along the length of the second clamping portion, then the ears are mutually fixed in relation to each other and the ears are also fixed in relation to the jaws. Thereby the risk of the ears bending is avoided.

In alternative embodiments, it is rendered possible for both the first clamping portion and the second clamping portion to provide other means than beads, e.g. buttons formed in the jaws. The application of such means and the shaping of these depend on the type of flexible item, such as cables, cords, wires, robes etc., which the suspension has to carry, and whether the suspension has to carry the item vertically, horizontally or in any other direction between vertically or horizontally. It is also possible to leave out any kind of means so that the jaws are quite plane on the inside.

The first clamping portion and the second clamping portion are preferably made from polyamide, which is fibre-strengthened, preferably with glass fibres. Polyamide has the advantage that it can absorb and emit moisture so that the securing of the cable is maintained independently of the air humidity in the surrounding atmosphere.

Figure 17:
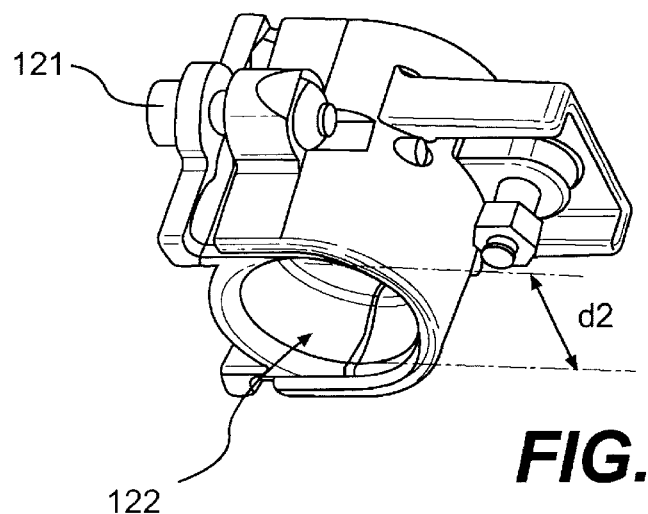
FIG. 17 is a perspective view of engagement between the first clamping portion and a first embodiment of the second clamping portion in a first application situation.

FIG. 17 shows a first clamping portion 101 and a first embodiment of the second clamping portion 113 in mutual engagement in a first application situation for cables with small diameter. The cable intended for being secured in the suspension is however left out for the sake of the illustration. The jaws 114 of the second clamping portion 113 extend inwards into the jaws 102 of the first clamping portion 101. The second clamping portion 13 has jaws extending along a given larger circle curve with a diameter d2. Bolts 121 extend through the holes 110, 118 in the ears 109, 117 of the first clamping portion 101 and the second clamping portion 113 respectively.

When, as in the shown application situation, the clamping portions are clamped towards each other by tightening the bolts, the through-going hole 122, which is formed between the jaws 102, 114 of the two clamping portions 101, 113, will have a substantially circular cross section. If the cable, which is intended for extending through the hole 122 formed between the jaws 102, 114, has a diameter slightly smaller than the diameter dl of the semicircle of the jaws 102 on the first clamping jaw (see FIGS. 9–13), said cable will be secured along practically the whole radius of the cable. In a specific embodiment, the suspension shown in FIG. 17 is capable of securing cables with a diameter of between 34 mm and 39 mm.

Figure 18:
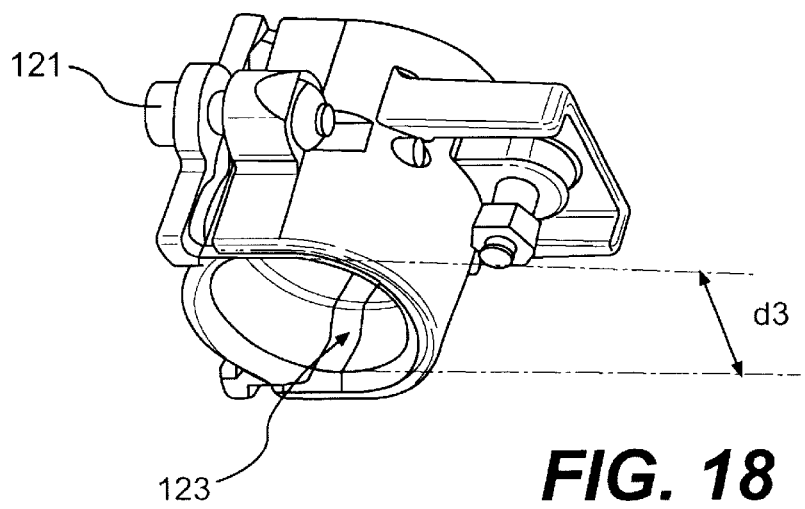
FIG. 18 is a perspective view of engagement between the first clamping portion and a second embodiment of the second clamping portion in a second application situation.

FIG. 18 shows a first clamping portion 101 and a second embodiment of the second clamping portion 113 in mutual engagement in a second application situation for securing cables with larger diameter. The cable intended for being secured in the suspension is however left out for the sake of the illustration. The jaws of the second clamping portion 113 extend inwards into the jaws 102 of the first clamping portion 101. The second clamping portion 113 has jaws 114 extending along a given smaller circle curve d3. Bolts 121 extend through the holes 110, 118 in the ears 109, 117 of the first clamping portion 101 and the second clamping portion 113, respectively.

When, as in the shown application situation, the clamping portions 101, 113 are clamped towards each other by the tightening the bolts 121, the through-going hole 123 formed between the jaws 102, 114 of the two clamping portions 101, 113, will have a substantially oval cross section with a semicircle in one end formed by the jaws 102 of the first clamping portion 113, and a smaller circle curve in the other end formed by the jaws 114 of the second clamping portion 113. If the cable intended for extending through the hole 123 formed between the jaws 102, 114 has a diameter, which is practically equal to the diameter d of the jaws 102 of the first clamping portion 101, said cable will be secured along practically the whole radius of the cable. In a specific embodiment, the suspension shown in FIG. 18 is capable of securing cables with a diameter of between 41 mm and 46 mm.

Figure 19:
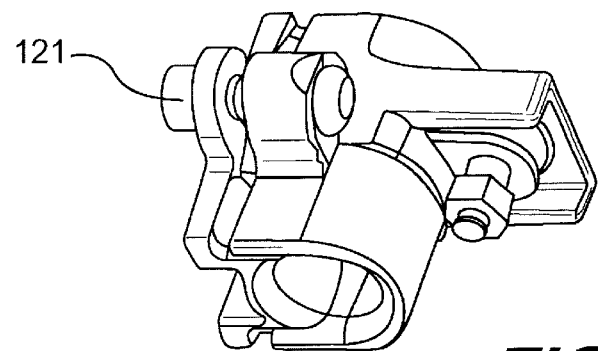
FIG. 19 is a perspective view of engagement between a second embodiment of the first clamping portion and a third embodiment of the second clamping portion.

FIG. 19 shows a second embodiment of the first clamping portion and a third embodiment of the second clamping portion in another application situation which is comparable with the other application situation described in FIG. 18. The difference between the clamping portions in FIG. 19 and the clamping portions in FIG. 18 is merely that the dimensions of the clamping portions in FIG. 19 are smaller than the dimensions of the clamping portions in FIG. 18. This means that the clamping portions in FIG. 19 are capable of securing cables having a smaller diameter than the cables that the suspension in FIG. 18 is capable of securing. In a specific embodiment, the suspension shown in FIG. 19 is capable of securing cables with a diameter of between 21 mm and 24 mm.

It is shown in all the FIGS. 17–19 that the bolts extending through the holes in the ears have a length so that the bolts just extend to the far side of the nut. Thereby the bolt will not pass the nut and accordingly the end of the nut will not take up any space when the clamping portions are clasped together. However, if at least one of the bolts have a length being substantially longer than the bolts shown then the bolt in question may function as a hinge between the first and the second clamping portion. If the bolt is longer then it will be possible to assemble the bolt and the nut but still having the opportunity to pull the first and the second clamping portions form each other for insertion of a cable into the jaws of the first clamping portion.

It is of great advantage to have the possibility to keep the first and the second clamping portion together before suspension of cables. Thereby there is no risk of dropping the second clamping portion in an attempt to hold both the cable and the second clamping portion in place while at the same time having to tighten the bolts. Suspension of a cable in the clamping portions by use of a long bolt as hinge takes place by firstly assembling one long bolt with the corresponding nut, then pulling the first clamping portion as far from the first clamping portions as the assembling of the long bolt and nut permit, then inserting the cable into the jaws of the first clamping portion, then inserting the jaws of the second clamping portion into the jaws of the first clamping portion, and finally assembling the other perhaps shorter bolt and nut and tightening both bolts and both nuts for clasping the clamping portions together around the cable.

Figure 20:
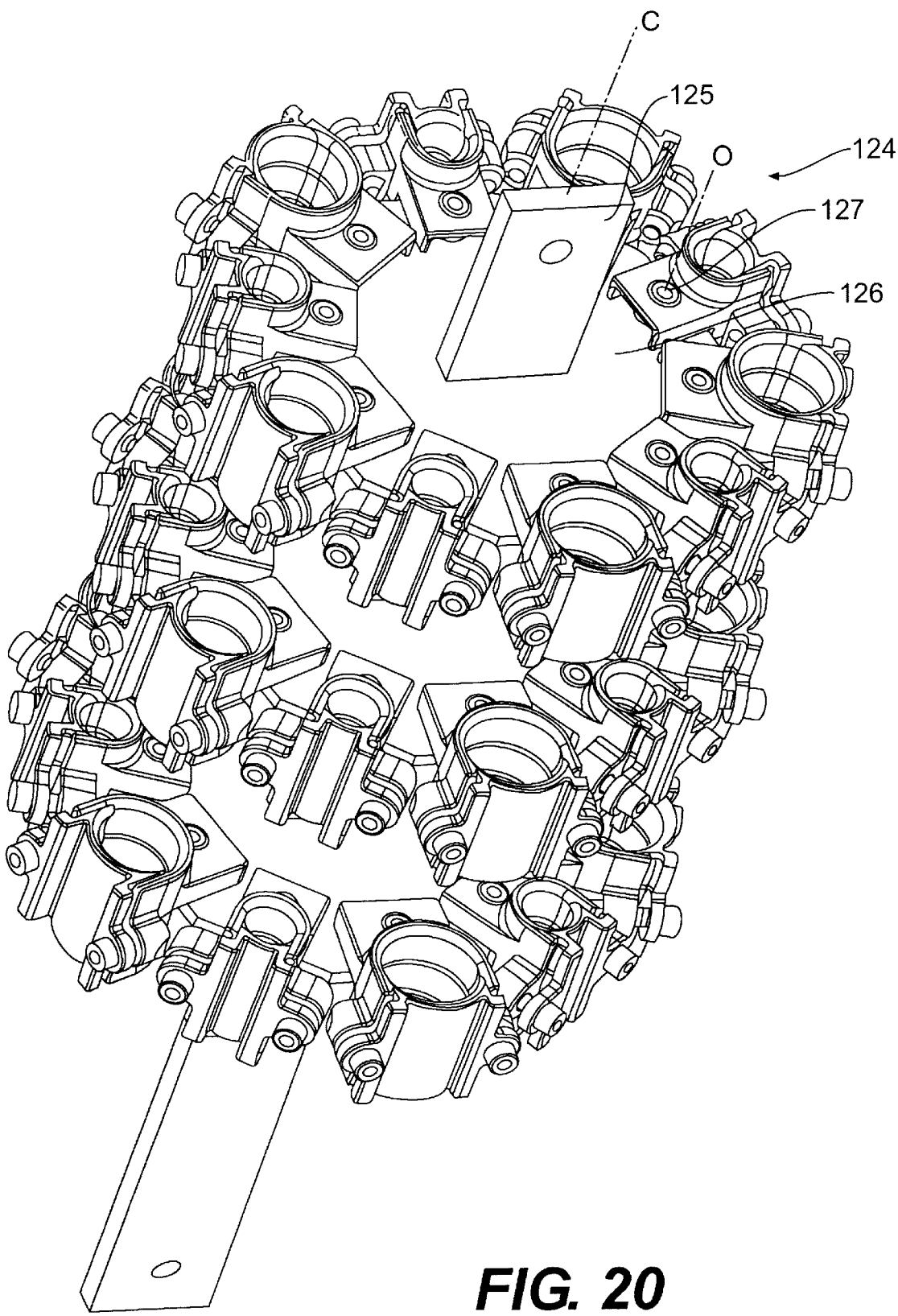
FIG. 20 is a perspective view of a first type of holder with a plurality of suspensions according to the invention mounted on a plurality of polygonal plates

FIG. 20 shows a first type of holder 124 for mounting a plurality of suspensions according to the invention. The holder 124 consists of a longitudinal carrying beam 125 and plate sections 126 attached to the carrying beam 125 at regular intervals. The suspensions are attached to the plate sections 126 by means of bolts 127. Thus, the holder 124 forms a kind of carousel with suspensions according to the invention. The plate sections 126 extend in planes P perpendicularly to the longitudinal axis C of the carrying beam 125. The shown holder 124 is intended for securing cables hanging vertically. With a holder 124 it is moreover secured that the cables are not in physical contact with each other, and thus no heat can be transferred between the cables.

With the shown suspensions and the shown number of suspensions it is possible to secure five cables with a small diameter and five cables with a large diameter. By providing three plate sections, which are arranged parallel to each other and with suspensions placed in continuation of each other, it is possible to secure the cable at three different places in continuation of each other in order to increase the securing and to ensure that the cables are secured even if one of the suspensions should break.

By means of the projections on the rear side of the jaws on the first clamping portion (see FIGS. 17–20), it is achieved that the suspensions cannot be considerably displaced sideways around an axis of rotation O through the bolts which extend through the hole in the tongue and which secure the suspensions to the plate sections. In alternative embodiments, it will be possible to apply a holder with more or fewer plate sections arranged parallel along the carrying iron and to mount fewer suspensions on each plate section.

For the shown holder with a plurality of first clamping portions and second clamping portions mounted on and to the holder, the above mentioned alternative manufacture of clamping portions where a first clamping portion and a corresponding second clamping portion are mutually joined at the manufacture by a kind of hinge connection, would be a suitable embodiment of the clamping portions. Also the above mentioned embodiment where a number of first clamping portions and a number of corresponding second clamping portions are mutually joined at the manufacture would be suitable for a holder to which a plurality of clamping portions have been attached. The hinge connection can have different shapes, depending on the necessary strength and the required physical size of the hinge connection.

The invention is described above with reference to specific embodiments of the first clamping portion and the second clamping portion. It will be possible to apply clamping portions with other means than opposite ears in order to keep the clamping portions clamped against each other. Moreover, it will be possible to secure the clamping portions in another way than by providing the first clamping portion with a tongue. Finally, it will be possible to let the jaws in the clamping portions extend over a larger or smaller length in order to establish a more or less firm securing of the cable between the jaws. If the clamping portions e.g. are applied for the securing of a cable hanging horizontally, it will not be necessary to secure the cable as firmly as when the cable is hanging vertically.

Figure 21:
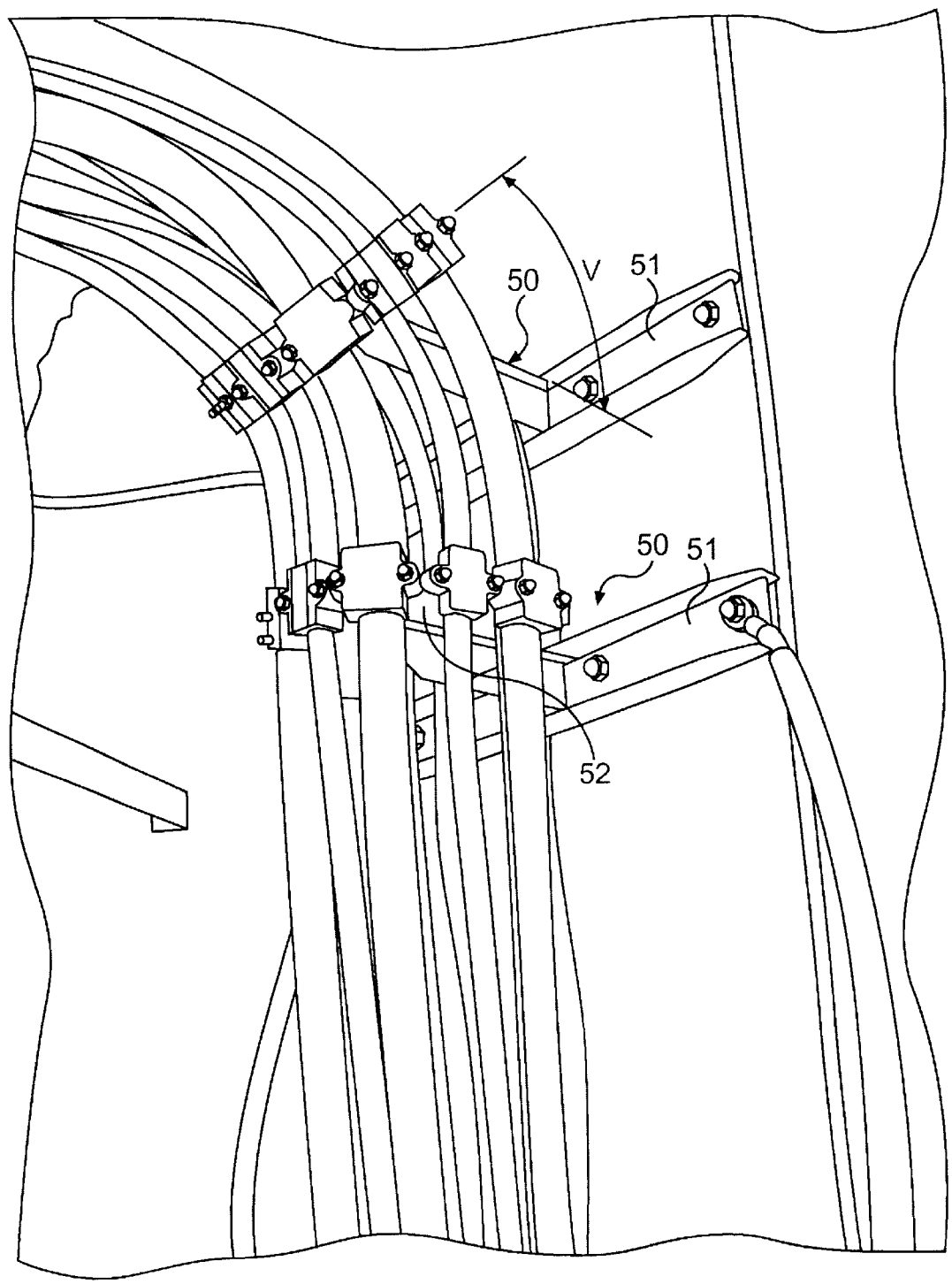
FIG. 21 is a photograph of a second type of holder with a plurality of suspensions according to the invention mounted on a polygonal plates.

FIG. 21 is a photograph of a pair of second type of holder 50. This holder 50 is not intended for being suspended but is intended, as shown, for being fastened to a stationary part of the wind turbine, in the embodiment shown fastened to the inner wall of the wind turbine tower 1 by means of braces 51. However, a plate 52 similar to the plate 126 for the first type of holder 124 shown in FIG. 20 is also a part of the second type of holder. Thus, the mounting of the suspensions with the clamping portions (see FIGS. 17.19) to the plate 51 of the holder takes place the same way as is described for the first type of holder.

As shown, the second type of holder 51 may have the plate orientated in different angular directions in relation to the fastening means that are secured to the inner wall of the wind turbine tower. The lower one of the holders has the plate orientated horizontally. The upper one of the holders has the plate orientated obliquely, perhaps in an angel V of 45° in relation to horizontal or vertical. However, other angels obliquely to horizontal or vertical may be used in stead. As can be seen from the figure, it is possible to bend the cables in a controlled manner by selecting a proper angel that the plate of the upper holder is orientated obliquely and by selecting a proper distance between the lower holder and the upper holder.

Figure 22:
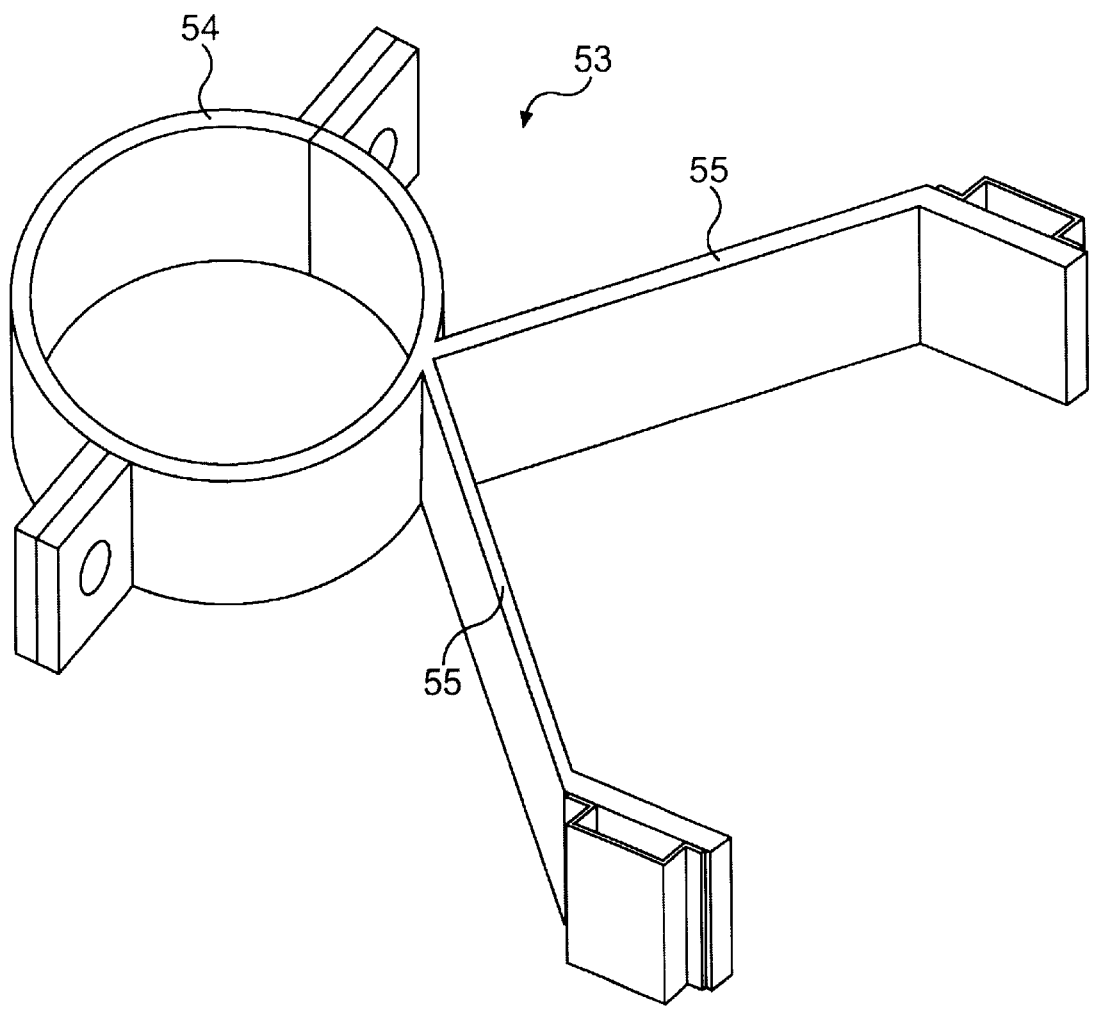
FIG. 22 is a sketch of a third type of holder for ensuring the maintenance of the cables in a horizontal direction.

FIG. 22 is a sketch of a third type of holder 53 for holding the cables in a horizontal direction. The holder has an annular member 54 that is intended for stretching round the cables in places in between the suspensions described above. The third type of holder 53 also has two legs 55 that are to be secured to the inner wall of the wind turbine tower or secured to a latter stretching upwards through the wind turbine tower. In high winds, then the wind turbine tower will show dynamic oscillations with a certain given natural vibration. When the wind turbine tower is showing natural vibration, then the cables stretching from the nacelle and down through the tower will also start showing dynamic oscillations.

However, the natural vibration of the cables is different than the natural vibration of the tower. Therefore the cables will start swinging some distance from side to side within the tower and with a certain amplitude. In order to ensure that the swinging from side to side of the cables is not exaggerated to an extend that is not desirable, then the third type of holder may be used. The third type of holder 53 will maintain the swinging of the cables within the annular member 54 of the holder. If the diameter of the annular holder is the same as that of the bundle of cables when these are suspended from the suspensions, then swinging of the cables can be completely avoided.

Figure 23:
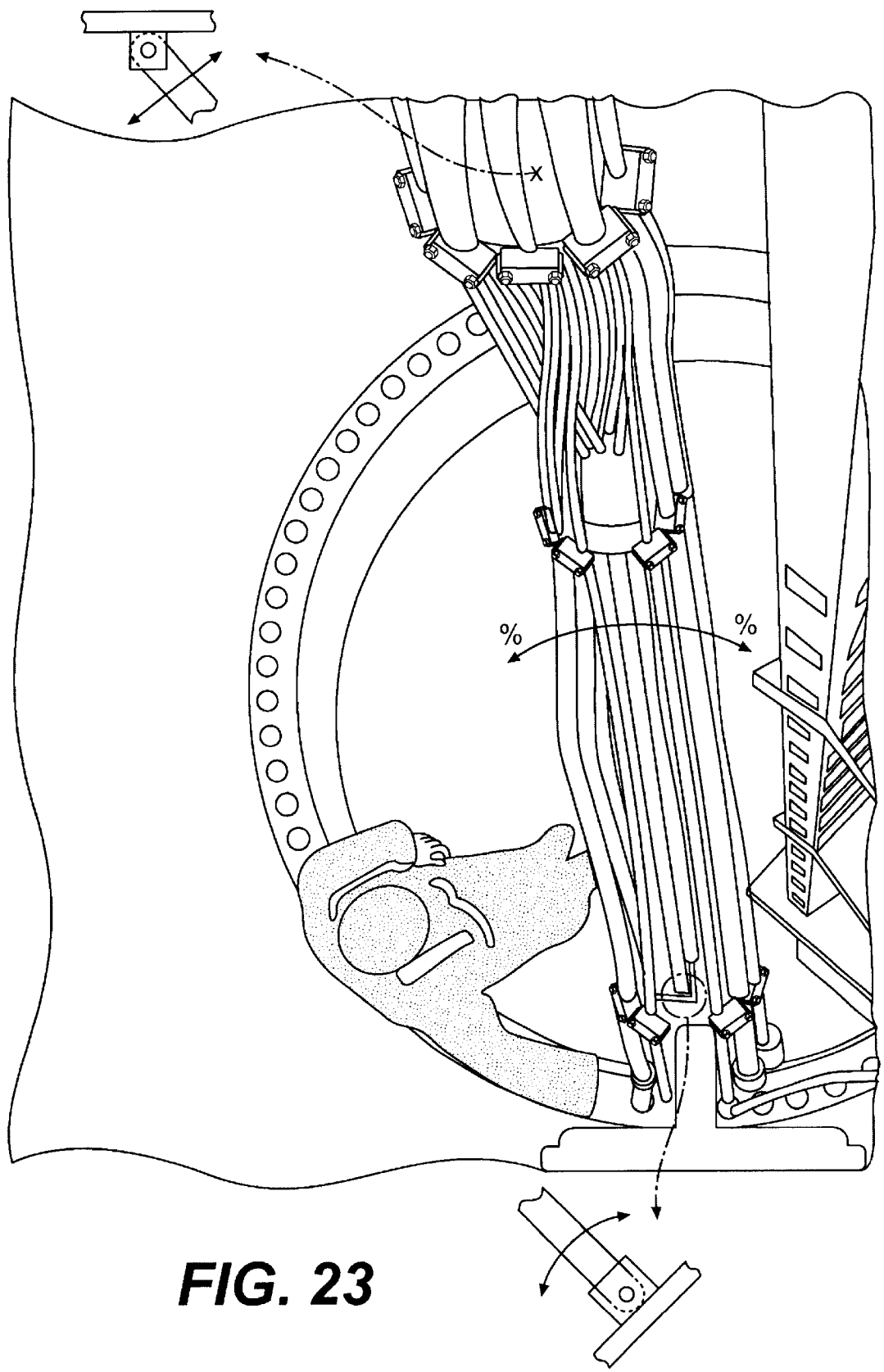
FIG. 23 is a photograph of a fourth type of holder also for ensuring the maintenance of the cables in a horizontal direction.

FIG. 23 is a photograph of a fourth type of holder. The holder consists of a rod 56 that is placed between a stationary part of the wind turbine and a first type of holder 124 that is suspended from the nacelle. The rod may as example be secured between the inner wall of the tower or items secured to the inner wall and a first type of holder being the lowest of the first type of holders that is suspended from the nacelle. The rod is rigid but is joined to the stationary part and the suspended first type of holder in a way so that the rod may swing upwards and downwards but is restricted from swinging sideways apart form swinging in the plane of the rod. The rod is also restricted from rotating. Preferably, as shown in the cut-out, the joining of the rod is made by way of a simple linkage with a hole 57 extending trough ends 58 of the rod 56, the ends being supported in a U-shaped brace 59 having holes 60 extending through the branches of the U, and a bolt 61 or split extending through the holes 60 in the branches of the brace 59 and through the hole 57 in the ends 58 of the rod 56.

The fourth holder ensures firstly that the lowest one of the suspended first holders does not have the possibility to start swinging because of the natural vibrations as mentioned above. Secondly the fourth holder ensures that the lower one of the suspended first holders does not have the possibility to rotate, when the nacelle rotates. This is an object in order to ensure that the part of the cables extending from the lower one of the first holders and to the stationary part of the wind turbine, which in the embodiment shown is a second type of holder (see FIG. 21) do not rotate. The rotation of the cables being suspended between the nacelle and the lower one of the first type of holder will be the only part of the cables that is being rotated. Because the rotation of this part of the cables takes place over a rather long distance, then the overall twisting of the cables is limited. If however the twisting of the cables took place only along the limited part extending between the lower one of the first type of holder and the stationary part, then the twisting of the cables would be excessive. This risk is eliminated by using the fourth type of holder, which is also evident from the figure.

It is however important that the lower one of the first type of holders can be raised and lowered in relation to the stationary part, because when the cables being suspended are twisted during the rotation of the nacelle, then the distance between the nacelle and the lower one of the first type of holders will decrease, and the lower holder will raise. Because of the linkage between the lower holder and the stationary part is made by a rigid rod then, when the lower holder is raised the lower holder will also be pulled a little towards the side of the stationary structure onto which the fourth type of holder is secured. The distance that the lower suspended holder is pulled sideways is, however, very limited depending on the distance that the lower suspended holder is raised.

Figure 24:
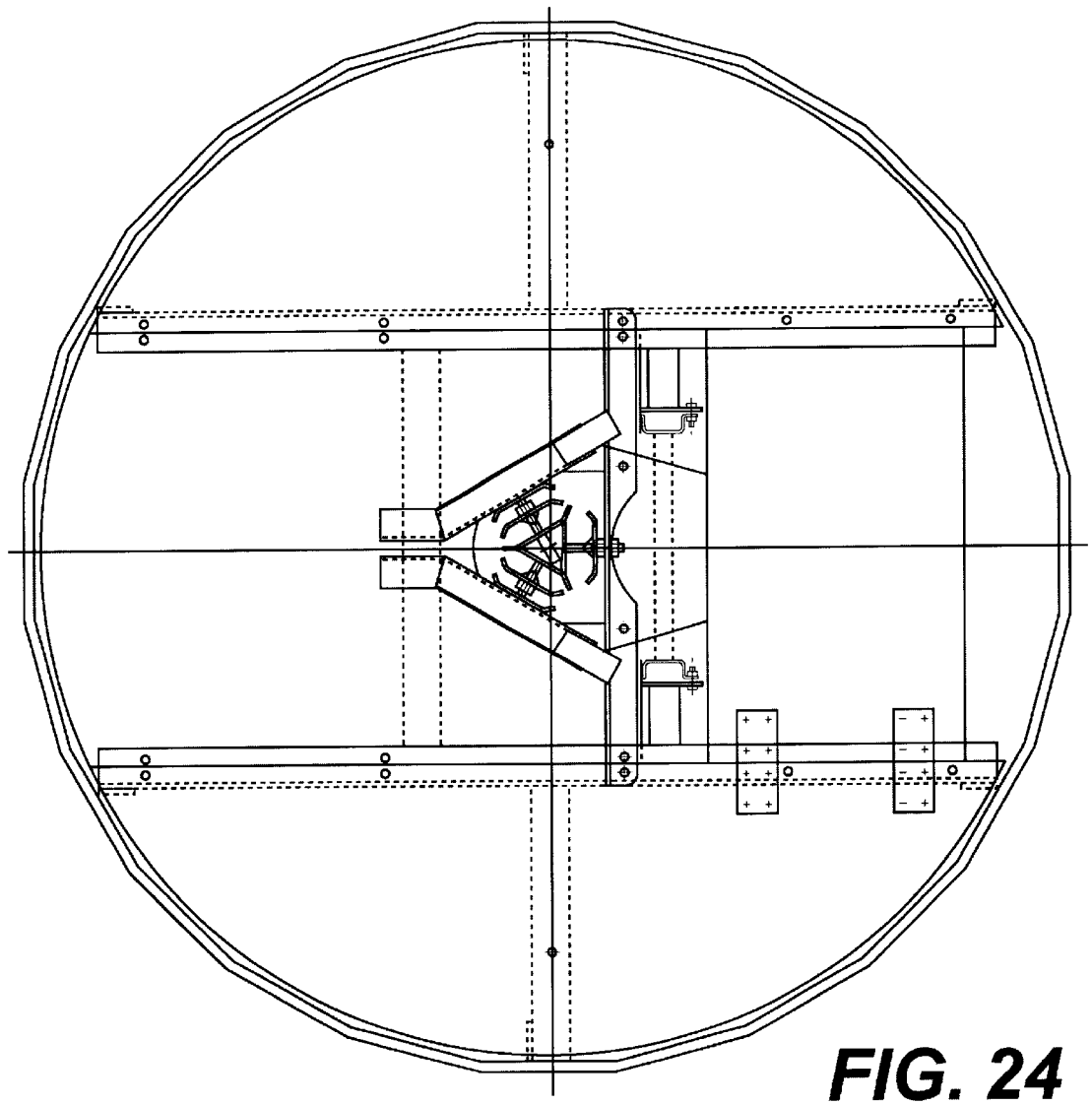
FIG. 24 and FIG. 25 are a drawings showing a way that suspensions may be temporarily secured to intermediate floors in the wind turbine tower.
Figure 25:
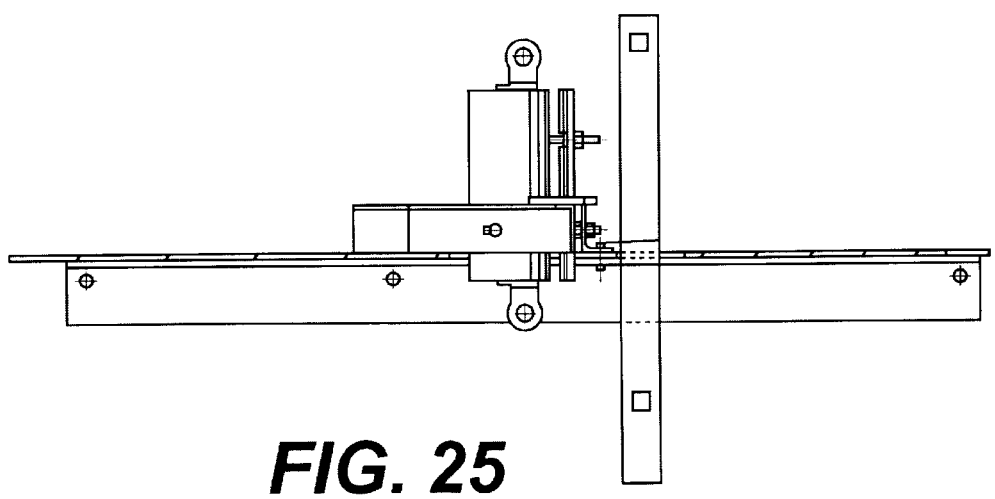

FIG. 24 shows a suspension that is secured to an intermediate floor in the wind turbine tower. Intermediate floors are provided in the tower and at least a floor is provided just below the nacelle. The suspension is by means of the bolts extending form the inner rod and outwardly secured to a triangular brace. The triangular brace is secured to the floor or to other fixed parts of the stationary part of the wind turbine, in this case the wind turbine tower. By securing one or more of the suspensions to intermediate floors or other fixed parts of the stationary part then it will be possible to install the cables before transporting the wind turbine to the location of erection without the risk of the cables being detached or in any other way being damaged during transportation. In the figure a brace is used because the suspension extends through a hole in the floor and the brace maintains the suspension in the center of the hole which is also the position of the suspension when the wind turbine is erected. However, other means than a brace may be used for maintaining the suspension in place in relation to the floor or other fixed part of the stationary part of the wind turbine.

When the cables are supported in the suspension and the suspension is temporarily secured to a fixed part of the stationary part then it is possible to install all cables before erecting the wind turbine. This makes it a lot easier to install the cables because the cables are rather heavy. If the cables are to be installed after the wind turbine has been erected, then it is necessary to first lift one end of the cables all the way from the bottom of the wind turbine to the nacelle, to attach the end of the cables at the appropriate place, and then afterwards suspending the suspensions and thereafter the cables to the suspensions. Especially the last step of suspending the cables in the suspensions is very difficult because the suspension must take place in the center of the tower, the center being difficult to reach.

It will be possible voluntarily to use the holders described solely or in combination. Each of the holders server their own purpose in suspending the cables form the nacelle to the bottom of the tower, and the more of the four holders that are used the more controlled will the suspension of the cables be. However, due to the rather limited space within the wind turbine tower it is also of interest to limit the numbers of holders used. In the above the invention is mostly described with reference to suspension of cables. However, it will be possible to suspend other like items, such as hoses, as example hydraulic hoses, or ropes etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wind turbine comprising a stationary part including a tower extending substantially vertically, a nacelle, a yawing system and a movable part being fixed to the nacelle, the nacelle comprising a wind rotor having at least one blade arranged on a main shaft having a substantially horizontal rotation axis and a power transmission system, the yawing system comprising a stationary part being fixed to an upper end of the tower and the movable part being fixed to the nacelle, the stationary part and the movable part being designed so that the nacelle is being supported vertically and horizontally by the tower and may pivot relatively to the tower about a substantially vertical yawing axis, and a plurality of elongated members such as bendable electrical power cables for transferring electrical power from the generator system, the plurality of elongated members such as the power cables being fastened at an upper end to the nacelle and at a lower end to the stationary part of the wind turbine, and a passage being defined between the nacelle and the tower and being positioned so that the vertical yawing axis passes through the passage, the plurality of elongated members such as the electrical power cables passing through the passage, said wind turbine further comprising at least a first suspension being suspended by the nacelle, the first suspension defining substantially vertically extending supporting surfaces, the outer surface of each of said elongated member such as the electrical power cables for a longitudinal length of at least four times the mean outer diameter of the item being in abutting contact with and squeezed between at least two of each supporting surfaces so that a substantial part of the weight of the member is supported by the first suspension.

2. The wind turbine according to claim 1, wherein the first suspension is arranged at an upper part of the tower in the passage between the tower and the nacelle.

3. The suspension to be used in wind turbine according to claim 1, wherein the supporting surfaces of the first suspension are formed from a resilient material.

4. The suspension according to claim 3, wherein said resilient material is plastic.

5. The wind turbine according to claim 1, wherein a plurality of spacing devices are arranged between the elongated members such as the electrical power cables with a vertical spacing between neighbouring spacing devices, each spacing device being arranged so as to maintain the members such as the power cables in a constant position in a horizontal plane of the spacing device with a mutual spacing between the members.

6. The wind turbine according to claim 5, wherein the spacing devices are suspended from a vertically extending elongated, flexible supporting means of which an upper end is suspended from the nacelle.

7. The wind turbine according to claim 6, wherein the supporting means is secured to an upper end of the first suspension.

8. The wind turbine according to claim 1 and comprising a second suspension being arranged at a lower vertical position than the first suspension, the second suspension defining substantially vertically extending supporting surfaces, the outer surface of each of said members such as the electrical power cables for a vertical length of at least four times the mean outer diameter of the member being in abutting contact with and squeezed between at least two of each supporting surfaces so that a substantial part of the weight of the member is supported by the second suspension.

9. The wind turbine according to claim 8, wherein the second suspension is being suspended from the nacelle.

10. The wind turbine according to claim 8, wherein the second suspension is supported by a vertically extending elongated, flexible supporting means such as a wire, a rope or a chain.

11. The wind turbine according to claim 10, wherein the supporting means is fastened at an upper end to the first suspension.

12. The suspension to be used in a wind turbine according to claim 8, wherein the supporting surfaces of the second suspension are formed from a resilient material.

13. The suspension according to claim 12, wherein said resilient material is plastic.

* * * * *